United States Patent [19]

Fennel

[11] Patent Number: 4,675,819
[45] Date of Patent: Jun. 23, 1987

[54] METHOD FOR THE GENERATION OF A VEHICLE REFERENCE SPEED AS A REFERENCE VALUE FOR THE CONTROL OF BRAKE SLIP AND/OR TRACTION SLIP

[75] Inventor: Helmut Fennel, Bad Soden, Fed. Rep. of Germany

[73] Assignee: ITT Industries, Inc., New York, N.Y.

[21] Appl. No.: 678,456

[22] Filed: Dec. 5, 1984

[30] Foreign Application Priority Data

Dec. 17, 1983 [DE] Fed. Rep. of Germany ....... 3345730

[51] Int. Cl.[4] .................... B60T 8/02; G06F 15/20
[52] U.S. Cl. ........................... 364/426; 303/105; 303/94; 303/106
[58] Field of Search .............. 364/426; 303/93, 97, 303/99, 91, 106–109, 110, 72; 188/181 C

[56] References Cited

U.S. PATENT DOCUMENTS

| | | | |
|---|---|---|---|
| 4,321,676 | 3/1982 | Ohmori et al. | 364/426 |
| 4,323,969 | 4/1982 | Skarvada | 364/426 |
| 4,395,761 | 7/1983 | Sato et al. | 364/426 |
| 4,499,543 | 2/1985 | Matsuda | 364/426 |
| 4,504,911 | 3/1985 | Braschel et al. | 364/426 |

Primary Examiner—Felix D. Gruber
Assistant Examiner—Thomas G. Black
Attorney, Agent, or Firm—James B. Raden; William J. Michals

[57] ABSTRACT

For the generation of a vehicle reference speed to serve as the reference value for the control of brake slip and/or traction slip in automotive vehicles, the rotational behavior of the controlled wheels is measured. The vehicle reference speed is defined by virtue of the rotational behavior of the individual wheels by way of logic combining, selection according to predetermined criteria and/or comparison with predetermined limit values. The wheel rotational behavior of each wheel is evaluated in comparison to the wheel-related vehicle reference speed ($V_{Ref}$) according to several predefined criteria is then classified into reference-defining periods. As a function of ascertained reference-defining period, a vehicle reference value ($b_{fzg}$) related to the individual wheel is determined which, together with the wheel-related vehicle reference values of the other wheels, determines the vehicle reference speed.

10 Claims, 2 Drawing Figures

METHOD FOR THE GENERATION OF A VEHICLE REFERENCE SPEED AS A REFERENCE VALUE FOR THE CONTROL OF BRAKE SLIP AND/OR TRACTION SLIP

BACKGROUND OF THE INVENTION

The present invention relates to a method and a configuration for the generation of a vehicle reference speed as a reference value for the control of brake slip and/or traction slip in automotive vehicles wherein the rotational behavior of the controlled wheels is measured, and the vehicle reference speed is defined by virtue of the rotational behavior of the individual wheels by way of logic combining, selection according to predetermined criteria and/or comparison with predetermined limit values.

In brake slip or traction slip control systems, precise vehicle reference speed as a reference value for the control action is the precondition for obtaining high quality of control. As the measurement of the actual vehicle speed with the aid of direct measuring methods such as radar or by means of a freely running wheel entails relatively great effort and involves additional disadvantages, it is preferred to derive the vehicle speed from the rotational behavior of the controlled wheels, which has to be determined anyway, by logic combining of the signals and by judicious selection, and by defining a vehicle reference speed appropriate for the control.

As long as the wheels encounter no brake slip or traction slip or only a low value thereof, the formation of the vehicle reference speed is relatively easy. However, when slip increases at one or at several of the wheels, this has to be taken into account when defining the reference value. There are two problems: on the one hand, control actions are required to be taken to gain the optimum information from the individual behavior of each separate wheel, while, on the other hand, those signals have to be detected from the combination of all wheels participating in the reference formation which represent the vehicle reference speed most precisely or which are best suited for the formation of the vehicle reference.

Methods are known for the purpose of anti-skid control wherein the reference value serving as the vehicle reference speed follows in principle the speed of the respectively fastest, second-fastest or third-fastest controlled wheel, while decreasing, however, at most with a gradient ($-1$ g) corresponding to the acceleration, which gradient is derived from the theoretic maximum of deacceleration (German printed and published patent application No. 22 54 295).

Moreover, anti-skid control systems are known wherein the negative gradient of the vehicle reference speed, depending on the road condition, takes on various predetermined values for better approximation to the actual vehicle speed variation (German printed and published patent application No. 22 09 955). Other antiskid control systems of this type are arranged to determine the discrepancy of the wheel speed signals from the reference signal in terms of magnitude and/or direction at the end of the control cycle, and are arranged to change the negative gradient of the reference value as a function of the determination for the purpose of adapting to the vehicle speed variation (German printed and published patent application No. 28 36 778).

All known methods for the formation of the vehicle reference speed bear the disadvantage that under circumstances such as very low value of friction (icy roads, slippery roads) or with rapidly changing road conditions, the vehicles reference deviates excessively from the vehicle speed and is thereby inappropriate as a reference value for slip control.

It is therefore the object of the present invention to provide a method for the generation of a vehicle reference speed which permits deviation of optimum information from the individual rotational behavior of the wheels, the information enables the derivation a suitable vehicle reference speed by way of combination and selection.

SUMMARY OF THE INVENTION

This object is achieved in a method in accordance with the present invention in which the wheel rotational behavior of each wheel is evaluated on several predefined criteria in comparison with the wheel-related vehicle reference speed and is subsequently classified into categories (that is, reference-defining periods) and in which, depending upon the respectively found reference-defining period, a vehicle reference value related to the individual wheel is determined and is evaluated together with the wheel-related vehicle reference values of the remaining wheels for the determination of the vehicle reference speed. The wheel-related vehicle reference speed will in many cases coincide with the vehicle reference speed relevant for the control of all wheels.

The classification into several categories of reference-defining periods is effected in accordance with the present invention by comparison of the individual wheel speeds with the vehicle reference speed in consideration of the sign of the wheel acceleration, as a result whereof the following five exemplary categories are defined, and a wheel-related vehicle reference value is derived depending on the category according to the relations indicated hereinbelow:

(a) $b_{Rad} \approx b_{Ref}$ (normal case); in this event, the wheel-related vehicle reference value is equated to the gradient of the wheel acceleration, which means $b_{fzg} = b_{Rad}$, (b) $v_{Rad} < v_{Ref}$ and $b_{Rad}$ negative, then applies: $b_{fzg} = K_1/b_{Rad}$, $-\infty < b_{Rad} < -1.3$ g (c) $v_{Rad} < v_{Ref}$ and $b_{Rad}$ positive, then applies: $b_{fzg} = -K_2 b_{Rad}$, $0.6$ g $< b_{Rad} < \infty$ (d) $v_{Rad} \geq -v_{Ref}$ and $b_{Rad}$ positive, then applies: $b_{fzg} = K_3/b_{Rad}$, $0.6$ g $< b_{Rad} < \infty$ and (e) $v_{Rad} \geq -v_{Ref}$ and $b_{Rad}$ negative, then applies: $b_{fzg} = -K_4 \cdot b_{Rad}$; $-\infty < b_{Rad} < -1.3$ g.

In addition, it will be provided according to an advantageous embodiment of this invention that, when the wheel stands still ($b_{Rad} = 0$), the vehicle reference value individual for each wheel will be assigned a progressively or linearly decreasing value.

In clock-controlled systems, the evaluation of the rotational behavior of the individual wheels expediently will be performed in comparison with the vehicle reference speed according to the predefined time scheme. It is also possible, on the other hand, to determine continuously wheel-related vehicle reference values and to compare them with the vehicle reference speed.

The method in accordance the present invention can be realized by means of conventional hard-wired electronic circuitries or by way of programmed circuitries, e.g. with a microcontroller.

A particular advantage of the method in accordance with the present invention is that the vehicle reference speed generated in the described way permits it use as a reference value for both the control of brake slip and of traction slip. Further, it is of importance that the obtained vehicle reference speed corresponds to the actual vehicle speed even at very low values of friction, or is quickly approximated to this speed again. That is, by observation of the wheel motion and determination of reference-defining periods, the invention allows optional adaptation of the reference values (i.e., of the vehicle reference speed) to the actual vehicle speed even in situations which are critical for the control.

BRIEF DESCRIPTION OF THE DRAWING

Further advantages, features and applications of the present invention follow from the following description when taken in conjunction with the accompanying drawing wherein.

DETAILED DESCRIPTION

The present invention provides universally applicable brake slip and traction slip control systems for the generation of a vehicle reference speed suitable as a reference value. The invention recognizes that the torque moving the wheel is at any time composed of the sum of brake torque and driving torque. When the wheel is deacceleration, the brake torque will be preponderant, whereas the driving torque is predominant when the wheel accelerates.

Figure 1:
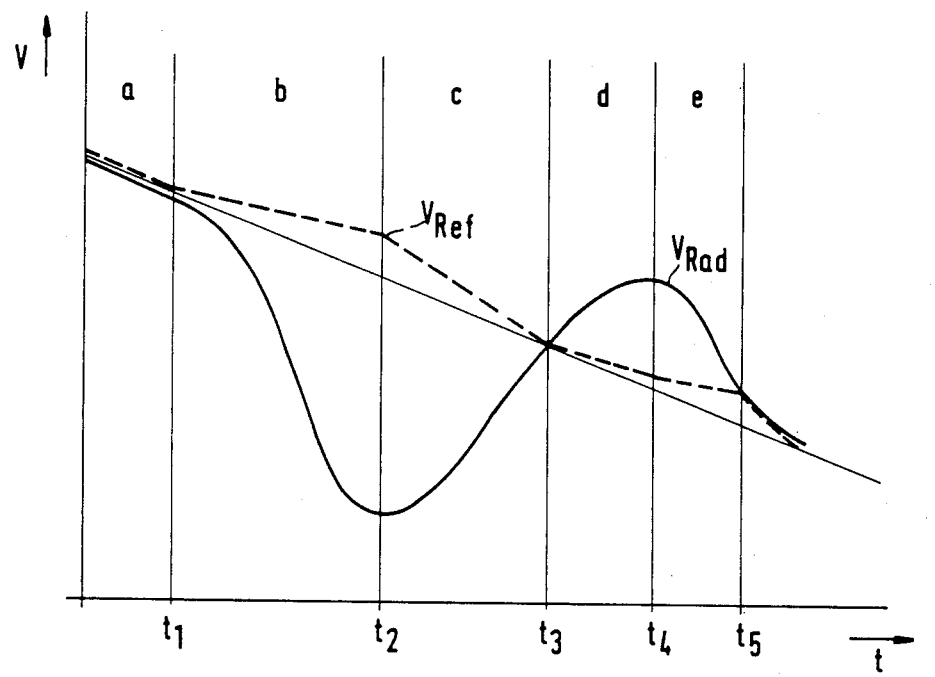
FIG. 1 is a diagram of the variation of the speed as well as of the acceleration or, respectively, deacceleration of a controlled braked vehicle wheel and the wheel-related vehicle reference speed derived therefrom by means of the present invention; and, FIG. 2 is a circuit configuration for implementing the method in accordance with the present invention.
Figure 1:
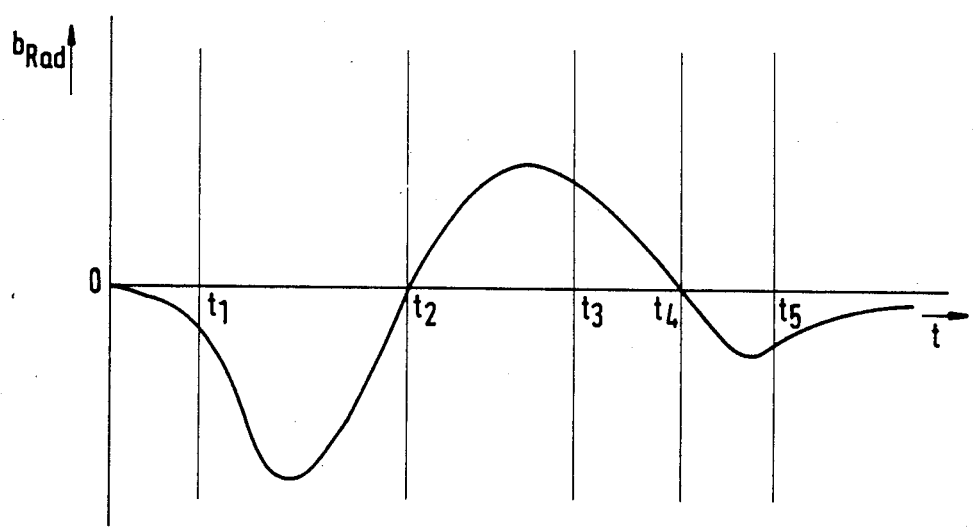

Due to slip, there is a relation between the wheel speed and the vehicle speed. As is shown in FIG. 1, from the consideration of the rotational behavior of the individual wheels in connection with the vehicle reference speed there results a classification into several reference-defining periods which, for example, are as follows:

(a) $b_{Rad} \approx b_{Ref}$ (normal case), ($-1.3g < b_{Rad} < 0.6$ g),
(b) $v_{Rad} < v_{Ref}$ and $b_{Rad}$ negative,
(c) $v_{Rad} < v_{Ref}$ and $b_{Rad}$ positive,
(d) $v_{Rad} \geq v_{Ref}$ and $b_{Rad}$ positive, and
(e) $v_{Rad} \geq v_{Ref}$ and $b_{Rad}$ negative.

The normal case, period a, applies when the individual wheel is deaccelerated or accelerated within the range of the vehicle dynamic, that is between about $+0.6$ g up to $-1.3$ g. In this range, the gradient of the vehicle reference speed is desired to equal the wheel acceleration according to the invention, i.e.

$$b_{fzg} = b_{Rad}.$$

The second reference-defining period, period b, will commence when the individual wheel is deaccelerated so much as to be exposed to greater slip. In this event, it is merely a question of the difference between the driving torque and the brake torque to what extent the wheel will be deaccelerated. At low friction values (slippery roads) and at high braking pressure, the wheel will be subject to great deacceleration. An excessive decrease of the vehicle reference speed would be inexpedient in this case, because then, first, there would become a wide discrepancy of the reference speed from the vehicle speed and because, secondly, the reference speed would quickly become zero and would not be available as a control criterion any more. It is therefore desired in this range to decrease the reference with a gradient which is inversely proportional to the wheel deacceleration. Thus, the formula in period b reads:

$$b_{fzg} = K_1 / b_{Rad}; \; (-\infty < b_{Rad} < -1.3 \text{ g})$$

A suitable value for $K_1$ can be derived from the reflection that, with $b_{Rad} = -1.3$ g, likewise the wheel-related vehicle reference valid ($b_{fzg}$) should attain a value of $-1.3$ g. In consequence thereof, $$K_1 = 1.69 \text{ g}^2.$$

In the period b, when the value of $K_1$ is as mentioned above, the wheel-related vehicle reference value $b_{fzg}$ can adopt any value within the range of 0 to $-1.3$ g. In general, $K_1$ should range between 0.5 $g^2$ and 5 $g^2$ approximately. The reference letter "g" implies in all cases the gravitational constant, its value amounting roughly to 9.81 m/s².

In order to accomplish that the speed of the examined wheel and the vehicle reference will meet again after the marked deacceleration in the second period, period b, the reference in a third period, period c, is desired to approximate the wheel speed differently closely depending upon the re-acceleration of the wheel. With steep re-accelerations, the driving torque will predominate. Either high friction values occur during control, or too little brake torque was generated. Quick approximation of the reference to the wheel speed is expedient in both cases. Therefore, in this third period, period c, in which $v_{Rad} < v_{Ref}$ applies and $b_{Rad}$ is positive, inventively, the vehicle reference will be determined according to the relation $$b_{fzg} = K_2 \cdot b_{Rad}, \; 0.6 \text{ g} < b_{Rad} < \infty$$

Suitably, $K_2$ will be chosen such that, with "normal" re-accelerations of the wheel ($b_{Rad} \approx 0$ to $+5$ g), the range between 0 and $-1.3$ g will be passed through. From this ensues that for instance $K_2$ can be defined as follows: $K_2 \approx 0.26$. In other cases, $K_2$ can be selected to range between 0.1 and 2.

The above mentioned three reference-defining periods (a) to (c) apply for brake slip. For traction slip, which is principally subject to the same physical relationships as brake slip is, two other reference-defining periods, namely the periods d and e will be fixed in the embodiment of the invention described herein.

When the wheel is accelerated caused by the engine torque in excess of the vehicle speed, after a certain period of time the reference is likely to differ from the value of the non-driven wheels so much that the control would be initiated as a result thereof. Therefore, the invention provides for a feedback to take place in this event. In the fourth reference-defining period, period d, in which the wheel speed considered is to be greater than or equal to the reference speed ($v_{Rad} \geq v_{Ref}$) and the wheel acceleration is to be positive, the reference value $b_{fzg}$ is determined to be:

$$b_{fzg} = K_3 / b_{Rad}.$$

An expedient value for $K_3$ is at about $K_3=0.36$ g$^2$, so that when $b_{Rad}=0.6$ g, there will also be $b_{fzg}=0.6$ g. In other cases, $K_3$ is within the range of 0.1 g$^2$ and 5 g$^2$.

During deacceleration of the exained wheel after overspeeding, as long as there still applies $V_{Rad} \geq V_{ref}$ ($b_{Rad}<0$), again a closer approximation of the reference ($b_{fzg}$) to the wheel deacceleration is desired. Therefore, in this fifth period, period e, the reference is determined according to the relation $b_{fzg} = -K_4 \cdot b_{Rad}$. An approximate value for $K_4$ is $K_4 \approx 0.12$, as a result whereof the reference will be raised by 0.6 g at a wheel deacceleration of $-5$ g. In general, $K_4$ should range between approximately 0.05 and 2.

A special case will apply if $b_{Rad}=0$. In this event, that is when the wheel is motionless, the reference preferably will be decreased progressively or linearly by means of a time criterion ($t_{max}$, see FIG. 2).

FIG. 1 illustrates the speed $V_{Rad}$ as well as the acceleration or, respectively, deacceleration $b_{Rad}$ of a controlledly braked vehicle wheel against time. The classification into the reference-defining periods a to e described hereinabove and the variation of the wheel-related reference speed $V_{Ref}$ defined by the inventive method are likewise represented in FIG. 1. For the sake of simplicity, $V_{Ref}$ was illustrated as being constant during each period, although it is arranged for by the invention to determine and to evaluate the wheel-related reference value continuously or in the operating clock of the electronics.

Until the time $t_1$ in FIG. 1, the so-termed normal case applies. In this zone, the gradient of the vehicle reference speed is approximately coincident with the wheel deacceleration so that the preconditions for the period a are fulfilled. The subsequent variation of the wheel speed $V_{Rad}$ leads to assume that either the value of adherence on the road is very low or the brake force is so high that there is the danger of wheel lock. The conditions of the reference-defining period b prevail in the interval between $t_1$ and $t_2$. Therefore, as has been described above, the vehicle reference speed $V_{Ref}$ will be decreased inversely proportional to the wheel deacceleration in this arrangement.

At the time $t_2$, $b_{Rad}$ becomes positive. The wheel speed continues to be lower than the reference speed. The driving torque predominates. Hence the conditions of the period c are fulfilled. By further decreasing the reference speed in comparison with the period b, a quicker approximation to the wheel speed will be accomplished.

The wheel-related reference value ($b_{fzg}$) obtained according to the inventive method by classification into reference-defining periods and by determination of the subsequent variation in dependence upon the "detected" period will then be compared with the corresponding individual reference values of the other wheels and logically combined. Now, that reference value will be determined or selected in a known manner according to preset criteria which suits best as the reference value for the control. It is likewise possible to form a mean value of several values determined by virtue of the inventive method.

In the subsequent periods d and e, the driving torque of the examined wheel is so great that the wheel speed $V_{Rad}$ rises in excess of the vehicle reference $V_{Ref}$. For that reason, the vehicle reference will be decreased inversely proportional to the wheel acceleration in the interval between $t_3$ and $t_4$. In the subsequent period e in which the wheel deaccelerates again, closer approximation of the reference speed to the wheel speed will be aimed at until the time $t_5$. After the time $t_5$, again the conditions of the period a will prevail in the embodiment according to FIG. 1 so that the wheel-related vehicle reference $b_{fzg}$ can be equated to the wheel acceleration $b_{Rad}$.

Figure 2:
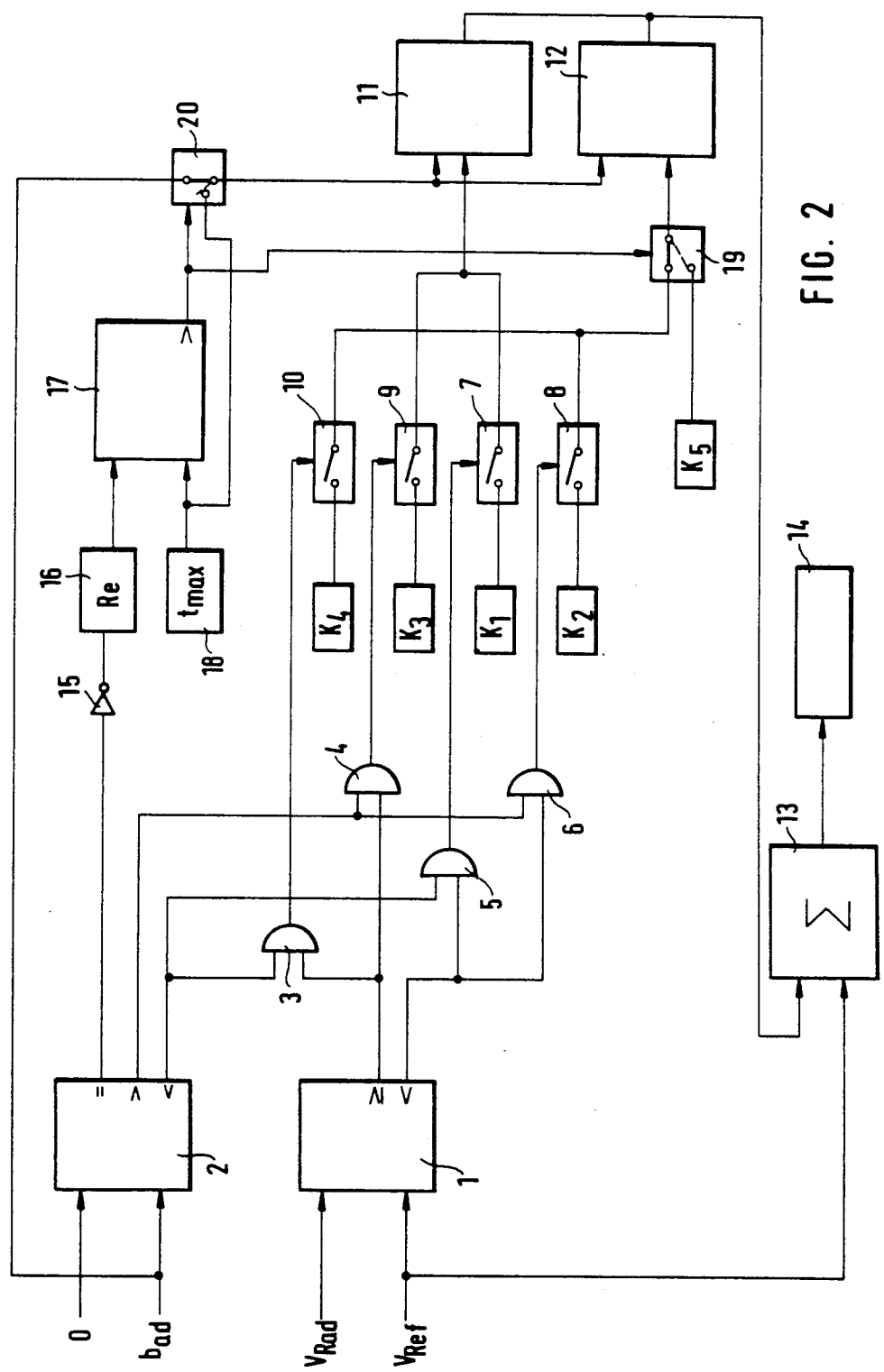

An embodiment of a circuit configuration for implementing the method described is disclosed in FIG. 2. According to FIG. 2, there is provision of a comparator 1 for comparison of the individual wheel speed $V_{Rad}$ with the reference speed $V_{Ref}$, and a comparator 2 for determination of the sign of the wheel acceleration $b_{Rad}$. Via the AND-gates 3, 4, 5 and 6, the outputs of the comparators 1, 2 are logically combined such that the four combinations possible ($V_{Rad}<V_{Ref}$, $b_{Rad}$ positive; $V_{Rad} \geq V_{Ref}$, $b_{Rad}$ positive; $V_{Rad}<V_{Ref}$, $b_{Rad}$ negative; $V_{Rad} \geq V_{Ref}$, $b_{Rad}$ negative) apply each one signal to any one of the switches 7, 8, 9 or 10.

Via the switch supplied with a signal 7, 8, 9 or 10 and closed thereby, the corresponding constant $K_1$, $K_2$, $K_3$ or $K_4$ will be delivered to the input of a divider 11 or a multiplier 12. Supplied to the second input of the divider 11 and the multiplier 12 will be the value $b_{Rad}$ representative of the instantaneous acceleration of the wheel so that at the output of the stages 11 or 12, depending on the position of the switch 7 to 10, the wheel-related vehicle reference $b_{fzg}$ will be present as the product of the wheel speed $b_{Rad}$ with $-K_2$ (period c) or with $-K_4$ (period e), or, respectively, as the quotient of the division of $K_1$ by $b_{Rad}$ (period b) or $K_3$ by $b_{Rad}$. The output value of the divider 11 or, respectively, of the multiplier 12 will be added to the reference speed $V_{Ref}$ by means of an adder 13, as a result whereof the further variation of the reference speed $V_{Ref}$ or, respectively, the $V_{Ref}$ value will be available in the end stage 14 in the next operating clock.

A third output of the comparator 2, that is the upper output in FIG. 2, is connected via an inverter 15 to the reset input of a counter 16, the output of which later leads to a comparator 17. Said comparator compares the contents of the counter 16 with a maximum time value $t_{max}$ which is represented by the circuitry 18.

If, in the "special case" described hereinabove, the acceleration $b_{Rad}=0$, a signal will appear at the third output of the comparator 2 by which the counter 16 will be put into operation through the inverter 15. If the counter contents becomes greater than $t_{max}$, a signal will be issued at the output of the comparator 17 and actuate a switch 19 which will then cause the constant $K_5$ to connect to the multiplier 12. Simultaneously, the signal at the output of the comparator 17 will actuate another switch 20 by virtue of which, instead of the wheel acceleration $b_{Rad}$, now the time value $t_{max}$ will be applied to the input of the divider 11 and the multiplier 12. It will be ensured thereby that the vehicle reference is decreased when the wheel stands still.

Instead of the circuit configuration according to FIG. 2, a correspondingly programmed microprocessor can be used to logically combine the signals present at the input of the comparators 1 and 2.

What is claimed is:

1. A method for the generation of a vehicle reference speed as a reference value for the control of brake and traction slip in automotive vehicles wherein the rotational behavior of the controlled wheels is measured, and the vehicle reference speed is defined by virtue of the rotational behavior of the individual wheels by way of comparison with predetermined limit values related to individual wheel speed, said method comprising the steps of: evaluating the wheel rotational behavior of each wheel in comparison to the individual wheel-related vehicle reference speed ($v_{Ref}$) according to a plurality of predetermined criteria including reference-defining ranges; and determining a vehicle reference value ($b_{fzg}$) related to the individual wheel as a function of the respectively ascertained reference-defining period and combining arithmetically the vehicle reference value to the wheel-related vehicle reference values of at least one other wheel for determining the vehicle reference speed.

2. A method as claimed in claim 1, wherein a differentiation and classification of the reference-defining periods into several categories is performed by way of comparison of the individual wheel speed ($v_{Rad}$) with the wheel-related vehicle reference speed ($v_{Ref}$) in consideration of the instantaneous speed variation ($b_{Rad}$) of the wheel.

3. A method as claimed in claim 2, wherein the differentiation of the reference-defining periods is performed in consideration of the direction of the wheel speed variation ($b_{Rad}$).

4. A method as claimed in caim 2, wherein the differentiation of the reference-defining periods is performed in consideration of the amount and the direction of the wheel speed variation ($b_{Rad}$).

5. A method as claimed in any one of claims 2 to 4, wherein the differentiation of the reference-defining range according to five categories is performed as follows:

(a) $b_{Rad} \approx b_{Ref}$ (normal case),
(b) $v_{Rad} < v_{Ref}$ and $b_{Rad}$ negative,
(c) $v_{Rad} < v_{Ref}$ and $b_{Rad}$ positive,
(d) $v_{Rad} \geq v_{Ref}$ and $b_{Rad}$ positive, and
(e) $v_{Rad} < v_{Ref}$ and $b_{Rad}$ negative.

6. A method as claimed in claim 5, wherein the vehicle reference value ($v_{bzg}$) related to the individual wheel is defined in the five categories according to the following relations:

(a) $b_{fzg} = b_{Rad}$; $-1.3$ g $< b_{Rad} < 0.6$ g
(b) $b_{fzg} = K_1/b_{Rad}$: $-\infty < b_{Rad} < 1.3$ g,
(c) $b_{fzg} = -K_2 \cdot b_{Rad}$; $0.6$ g $< b_{Rad} < \infty$
(d) $b_{fzg} = K_3/b_{Rad}$; $0.6$ g $< b_{Rad} < \infty$ and
(e) $b_{fzg} = -K_4 \cdot b_{Rad}$; $-\infty < b_{Rad} < -1.3$ g.

7. A method as claimed in claim 5, wherein the following values are chosen for the constants:
$K_1 = 0.5$ to 5 g$^2$, preferably 1.7 g$^2$
$K_2 = 0.1$ to 2, preferably 0.25
$K_3 = 0.1$ to 5 g$^2$, preferably 0.4 g$^2$
$K_4 = 0.05$ to 2, preferably 0.1.

8. A method as claimed in claim 1, a progressively or linearly decreasing value is assigned to the vehicle reference value individual for each wheel when the wheel stands still ($b_{Rad} = 0$).

9. A method as claimed in claim 1, wherein the evaluation of the rotational behavior of the individual wheels in comparison to the vehicle reference speed is performed according to a predefined time scheme.

10. A method as claimed in claim 1, wherein the evaluation of the rotational behavior of the individual wheels in comparison to the vehicle reference speed is performed continuously.

* * * * *